(12) United States Patent
Furukawa et al.

(10) Patent No.: US 11,445,109 B2
(45) Date of Patent: Sep. 13, 2022

(54) IMAGE PROCESSING DEVICE, IMAGE CAPTURING DEVICE, IMAGE PROCESSING METHOD, AND STORAGE MEDIUM

(71) Applicant: OLYMPUS CORPORATION, Hachioji (JP)

(72) Inventors: Eiji Furukawa, Saitama (JP); Shunichi Koga, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 276 days.

(21) Appl. No.: 16/715,583

(22) Filed: Dec. 16, 2019

(65) Prior Publication Data
US 2020/0120271 A1  Apr. 16, 2020

Related U.S. Application Data

(63) Continuation of application No. PCT/JP2017/024578, filed on Jul. 5, 2017.

(51) Int. Cl.
*H04N 5/232* (2006.01)
*G06T 3/40* (2006.01)
*G06T 7/20* (2017.01)

(52) U.S. Cl.
CPC ....... *H04N 5/23232* (2013.01); *G06T 3/4007* (2013.01); *G06T 7/20* (2013.01)

(58) Field of Classification Search
CPC ...... H04N 5/23232; H04N 5/349; H04N 9/07; H04N 5/23277; H04N 5/357;
(Continued)

(56) References Cited

U.S. PATENT DOCUMENTS

| | | |
|---|---|---|
| 5,754,226 A | 5/1998 | Yamada et al. |
| 5,907,353 A | 5/1999 | Okauchi |

(Continued)

FOREIGN PATENT DOCUMENTS

| | | |
|---|---|---|
| EP | 1640908 A1 | 3/2006 |
| JP | H08265626 A | 10/1996 |

(Continued)

OTHER PUBLICATIONS

"Super-Resolution Considering Registration Error", General Lecture Collection of Forum on Information Technology, The Institute of Electronics, Information and Communication Engineers Information and Systems Society, Information Processing Society of Japan, 2006 5(3), pp. 63-64.

(Continued)

*Primary Examiner* — Lin Ye
*Assistant Examiner* — Tuan H Le
(74) *Attorney, Agent, or Firm* — Holtz, Holtz & Volek PC

(57) ABSTRACT

An image processing device comprises: one or more processors comprising hardware, the one or more processors being configured to: generate a high-resolution combined image by aligning a plurality of time-series images with each other in a high-resolution image space having a resolution higher than the plurality of time-series images based on an amount of displacement between the plurality of time-series images, and combining the plurality of time-series images; generate a low-resolution combined image by aligning the plurality of time-series images with each other in a low-resolution image space having a resolution equal to or lower than the resolution of the plurality of time-series images based on the amount of displacement, combining the plurality of time-series images through weighted addition; calculate a feature quantity pertaining to a pixel-value change direction at each region in the generated low- (Continued)

resolution combined image; and correct the high-resolution combined image based on the calculated feature quantity.

17 Claims, 8 Drawing Sheets

(58) Field of Classification Search
CPC ............ H04N 5/2253; H04N 9/04551; H04N 5/23299; G06T 3/4007; G06T 7/20; G06T 3/4069; G06T 2207/10024; G06T 2207/20221; G06T 5/50; G06T 3/40; G06T 7/32
See application file for complete search history.

(56) References Cited

U.S. PATENT DOCUMENTS

| | | | |
|---|---|---|---|
| 6,266,086 | B1 | 7/2001 | Okada et al. |
| 8,964,843 | B2 | 2/2015 | Furukawa et al. |
| 9,898,803 | B2 | 2/2018 | Kajimura |
| 10,026,155 | B1 | 7/2018 | Furukawa |
| 10,389,952 | B2 | 8/2019 | Furukawa et al. |
| 10,477,236 | B2 | 11/2019 | Furukawa |
| 10,491,815 | B2 | 11/2019 | Kajimura et al. |
| 11,037,310 | B2 | 6/2021 | Okazawa et al. |
| 11,146,746 | B2 * | 10/2021 | Furukawa .......... H04N 9/04551 |
| 2005/0163398 | A1 | 7/2005 | Ioka |
| 2009/0033792 | A1 * | 2/2009 | Kano .................... H04N 5/145 348/441 |
| 2009/0129704 | A1 | 5/2009 | Toda |
| 2009/0185760 | A1 * | 7/2009 | Okada .................. G06T 3/4069 382/299 |
| 2010/0067820 | A1 | 3/2010 | Yano |
| 2010/0119176 | A1 * | 5/2010 | Ichihashi ................ G06T 3/403 382/300 |
| 2011/0157380 | A1 | 6/2011 | Yamazaki |
| 2012/0113221 | A1 | 5/2012 | Yamada et al. |
| 2012/0321185 | A1 | 12/2012 | Toda |
| 2013/0308877 | A1 * | 11/2013 | Tezuka .................. G06T 3/4007 382/300 |
| 2015/0319363 | A1 | 11/2015 | Furukawa |
| 2016/0094767 | A1 | 3/2016 | Yamamoto |
| 2016/0127649 | A1 | 5/2016 | Tsuchiya |
| 2016/0373649 | A1 | 12/2016 | Honda et al. |
| 2017/0024856 | A1 * | 1/2017 | Kajimura .................. G06T 7/32 |
| 2018/0077360 | A1 | 3/2018 | Furukawa et al. |
| 2018/0225810 | A1 | 8/2018 | Kajimura |

FOREIGN PATENT DOCUMENTS

| | | |
|---|---|---|
| JP | H10056595 A | 2/1998 |
| JP | H11225284 A | 8/1999 |
| JP | 2000209432 A | 7/2000 |
| JP | 2004259232 A | 9/2004 |
| JP | 2004343222 A | 12/2004 |
| JP | 2008293185 A | 12/2008 |
| JP | 2009237650 A | 10/2009 |
| JP | 2010140460 A | 6/2010 |
| JP | 2011139169 A | 7/2011 |
| JP | 2011199786 A | 10/2011 |
| JP | 2015022215 A | 2/2015 |
| JP | 2015192199 A | 11/2015 |
| JP | 2015204599 A | 11/2015 |
| JP | 2016181023 A | 10/2016 |
| JP | 2017011329 A | 1/2017 |
| JP | 2017044878 A | 3/2017 |
| JP | 2017045273 A | 3/2017 |
| JP | 2018050343 A | 3/2018 |
| WO | 2007142109 A1 | 12/2007 |
| WO | 2008143360 A1 | 11/2008 |
| WO | 2015012076 A1 | 1/2015 |
| WO | 2015145856 A1 | 10/2015 |
| WO | 2015159581 A1 | 10/2015 |
| WO | 2017064807 A1 | 4/2017 |
| WO | 2019008693 A1 | 1/2019 |
| WO | 2019092844 A1 | 5/2019 |

OTHER PUBLICATIONS

International Search Report (ISR) dated Oct. 3, 2017 (and English translation thereof) issued in International Application No. PCT/JP2017/024579.
International Search Report (ISR) dated Sep. 26, 2017 (and English translation thereof) issued in International Application No. PCT/JP2017/024578.
Written Opinion (WO) dated Oct. 3, 2017 issued in International Application No. PCT/JP2017/024579.
Written Opinion (WO) dated Sep. 26, 2017 issued in International Application No. PCT/JP2017/024578.
Notice of Allowance dated Jul. 9, 2021 issued in related U.S. Appl. No. 16/715,837.
Related U.S. Appl. No. 16/715,837; Title: Image Processing Device, Image Capturing Device, Image Processing Method, and Storage Medium; First Named Inventor: Eiji Furukawa filed Dec. 16, 2019.
International Search Report (ISR) (and English language translation thereof) dated Feb. 10, 2020, issued in International Application No. PCT/JP2019/047376 (which is an International counterpart of related U.S. Appl. No. 17/697,309.
International Search Report (ISR) and Written Opinion dated Jan. 30, 2018 issued in International Application No. PCT/JP2017/040544 (which is an International counterpart of related U.S. Appl. No. 16/203,001).
International Search Report (ISR) (and English language translation thereof) dated Feb. 10, 2020, issued in International Application No. PCT/JP2019/047376 (which is an International counterpart of related U.S. Appl. No. 16/203,001).
International Search Report (ISR) and Written Opinion dated Jan. 30, 2018 issued in International Application No. PCT/JP2017/040544 (which is an International counterpart of related U.S. Appl. No. 17/697,309).
Notice of Allowance dated Jul. 31, 2019, issued in related U.S. Appl. No. 16/203,001.
U.S. Appl. No. 16/203,001, First Named Inventor: Kosuke Kajimura; Title: "Image-Processing Apparatus, Image-Processing Method, and Non-Transitory Computer Readable Medium Storing Image-Processing Program"; filed Nov. 28, 2018.
U.S. Appl. No. 17/697,309, First Named Inventor: Takeshi Fukutomi; Title: "Image Acquisition Apparatus and Camera Body"; filed Mar. 17, 2022.

* cited by examiner

Gr CHANNEL

| $\frac{Gr4+Gr8}{2}$ | $\frac{Gr3+Gr7}{2}$ | $\frac{Gr4+Gr8}{2}$ | $\frac{Gr3+Gr7}{2}$ |
|---|---|---|---|
| $\frac{Gr2+Gr6}{2}$ | $\frac{Gr1+Gr5}{2}$ | $\frac{Gr2+Gr6}{2}$ | $\frac{Gr1+Gr5}{2}$ |
| $\frac{Gr4+Gr8}{2}$ | $\frac{Gr3+Gr7}{2}$ | $\frac{Gr4+Gr8}{2}$ | $\frac{Gr3+Gr7}{2}$ |
| $\frac{Gr2+Gr6}{2}$ | $\frac{Gr1+Gr5}{2}$ | $\frac{Gr2+Gr6}{2}$ | $\frac{Gr1+Gr5}{2}$ |

Gb CHANNEL

| $\frac{Gb1+Gb5}{2}$ | $\frac{Gb2+Gb6}{2}$ | $\frac{Gb1+Gb5}{2}$ | $\frac{Gb2+Gb6}{2}$ |
|---|---|---|---|
| $\frac{Gb3+Gb7}{2}$ | $\frac{Gb4+Gb8}{2}$ | $\frac{Gb3+Gb7}{2}$ | $\frac{Gb4+Gb8}{2}$ |
| $\frac{Gb1+Gb5}{2}$ | $\frac{Gb2+Gb6}{2}$ | $\frac{Gb1+Gb5}{2}$ | $\frac{Gb2+Gb6}{2}$ |
| $\frac{Gb3+Gb7}{2}$ | $\frac{Gb4+Gb8}{2}$ | $\frac{Gb3+Gb7}{2}$ | $\frac{Gb4+Gb8}{2}$ |

ARITHMETIC AVERAGE

| G | G | G | G |
|---|---|---|---|
| G | G | G | G |
| G | G | G | G |
| G | G | G | G |

| G00 | G01 | G02 | G03 | G04 |
|-----|-----|-----|-----|-----|
| G10 | G11 | G12 | G13 | G14 |
| G20 | G21 | G22 | G23 | G24 |
| G30 | G31 | G32 | G33 | G34 |
| G40 | G41 | G42 | G43 | G44 |

| G00 | G01 | G02 | G03 | G04 |
|-----|-----|-----|-----|-----|
| G10 | G11 | G12 | G13 | G14 |
| G20 | G21 | G22 | G23 | G24 |
| G30 | G31 | G32 | G33 | G34 |
| G40 | G41 | G42 | G43 | G44 |

IMAGE PROCESSING DEVICE, IMAGE CAPTURING DEVICE, IMAGE PROCESSING METHOD, AND STORAGE MEDIUM

CROSS-REFERENCE TO RELATED APPLICATIONS

This is a continuation of International Application PCT/JP2017/024578, with an international filing date of Jul. 5, 2017, which is hereby incorporated by reference herein in its entirety.

TECHNICAL FIELD

The present invention relates to image processing devices, image capturing devices, image processing methods, image processing programs, and storage media and in particular relates to a technique for combining a higher-resolution image from a plurality of images.

BACKGROUND ART

As a technique for increasing the resolution of an image, there is a well-known method in which a plurality of images are acquired while an image capturing element is being displaced in a direction orthogonal to the optical axis thereof, and with the amounts of displacement taken into consideration, the pixels of the plurality of images are arranged in a high-resolution image space having a higher resolution than the plurality of images, thereby generating a high-resolution combined image (refer to, for example, PTL 1). Acquired images of a subject such as a fine pattern suffer folding noise (aliasing). Because the above-described technique allows folding noise to be removed and high-frequency components to be reproduced by combining a plurality of images that are displaced relative to one another, the technique can produce a resolution-increasing effect.

However, in order to produce a resolution-increasing effect by using the above-described technique, it is necessary to highly accurately position the image capturing element to a target location and hold the image capturing element in a stationary state at the target location during exposure. This is a technical challenge. As means for removing a positioning error, there is a method in which the amount of motion between a plurality of images is estimated, and the plurality of images are then combined in a high-resolution image space so as to cancel out the amount of motion. However, it is also a technical challenge to estimate the amount of motion in an error-free manner.

Even if the amount of error-free motion can be estimated, an alignment error is inevitable when pixels are aligned and arranged in the high-resolution image space so as to cancel out the amount of motion. More specifically, when the high-resolution combined image is to be produced, ideally, the pixels of the plurality of images are arranged in an infinite-resolution image space, and then the resolution is adjusted to a desired resolution by reduction processing or the like. However, it is not possible to prepare an actual infinite-resolution image space. For this reason, in practice, an image space having a finite resolution is set according to an available amount of memory, and the pixels are then arranged in that image space. Therefore, an alignment error occurs when the pixels are arranged, and such an alignment error causes a knurl artifact particularly at an edge portion with a large luminance difference.

As solutions for eliminating a knurl artifact caused by such an alignment error, the technique in PTL 1 could be applied. In this technique, a degree of similarity between a plurality of images is calculated, and the combining ratio between the images is controlled on the basis of this degree of similarity. When this technique is to be applied, a possible procedure may be such that, for example: one of the plurality of images is set as a base image, and the images other than the base image are set as reference images; the base image and the reference images are enlarged until they have a resolution equal to the resolution of a desired high-resolution combined image; the enlarged base image and each of the enlarged reference images are aligned by taking into account the amount of displacement between the images; the difference between the base image and each of the reference images is calculated for each region; the degree of similarity between both the images is determined from the amount of difference; and correction processing is performed on the basis of the determination result. Correction processing is not performed on regions having a small alignment error and a high degree of similarity but is performed on regions with a large alignment error and a low degree of similarity. For example, a knurl artifact is corrected by determining an edge direction in the base image and applying correction processing, such as direction filtering, along the edge direction.

CITATION LIST

Patent Literature

{PTL 1}
Japanese Unexamined Patent Application, Publication No. 2011-199786

SUMMARY OF INVENTION

A first aspect of the present invention is directed to an image processing device including: one or more processors comprising hardware, the one or more processors being configured to: generate a high-resolution combined image by aligning a plurality of time-series images with each other in a high-resolution image space having a resolution higher than the plurality of time-series images based on an amount of displacement between the plurality of time-series images, and combining the plurality of time-series images; generate a low-resolution combined image by aligning the plurality of time-series images with each other in a low-resolution image space having a resolution equal to or lower than the resolution of the plurality of time-series images based on the amount of displacement, combining the plurality of time-series images through weighted addition; calculate a feature quantity pertaining to a pixel-value change direction at each region in the generated low-resolution combined image; and correct the high-resolution combined image based on the calculated feature quantity.

A second aspect of the present invention is directed to an image capturing device including: an image acquisition unit that is configured to acquire a plurality of time-series images; and one of the above-described image processing devices for processing the acquired plurality of time-series images.

A third aspect of the present invention is directed to an image processing method including: generating, by one or more processors, a high-resolution combined image by aligning the plurality of time-series images with each other in a high-resolution image space having a resolution higher than the plurality of time-series images based on an amount of displacement between the plurality of time-series images, and combining the plurality of time-series images; generating, by the one or more processors, a low-resolution combined image by aligning the plurality of time-series images with each other in a low-resolution image space having a resolution equal to or lower than the resolution of the plurality of time-series images based on the amount of displacement, combining the plurality of time-series images through weighted addition; calculating, by the one or more processors, a feature quantity pertaining to a pixel-value change direction at each pixel or each region in the generated low-resolution combined image; and correcting, by the one or more processors, the high-resolution combined image based on the calculated feature quantity.

A fourth aspect of the present invention is directed to a non-transitory computer-readable storage medium storing an image processing program for causing a computer to execute: generating a high-resolution combined image by aligning the plurality of time-series images with each other in a high-resolution image space having a resolution higher than the plurality of time-series images based on an amount of displacement between the plurality of time-series images, and combining the plurality of time-series images; generating a low-resolution combined image by aligning the plurality of time-series images with each other in a low-resolution image space having a resolution equal to or lower than the resolution of the plurality of time-series images based on the amount of displacement, combining the plurality of time-series images through weighted addition; calculating a feature quantity pertaining to a pixel-value change direction at each pixel or each region in the generated low-resolution combined image; and an image correction step of correcting the high-resolution combined image based on the calculated feature quantity.

BRIEF DESCRIPTION OF DRAWINGS

FIG. 4 is a diagram depicting an example of a high-resolution combined image for each channel generated by the high-resolution combining unit.

FIG. 5 is a diagram for illustrating a method for generating a low-resolution combined image with a low-resolution combining unit.

FIG. 7 is a diagram depicting an example of direction filters used by an image correction unit.

FIG. 8 is a diagram for illustrating a method for calculating a feature quantity with the feature-quantity calculation unit in an image processing device according to a second embodiment of the present invention, showing a portion of a low-resolution combined image.

DESCRIPTION OF EMBODIMENTS

First Embodiment

An image processing device 1 according to a first embodiment of the present invention and an image capturing device 10 including the same will now be described with reference to FIGS. 1 to 7.

Figure 1:
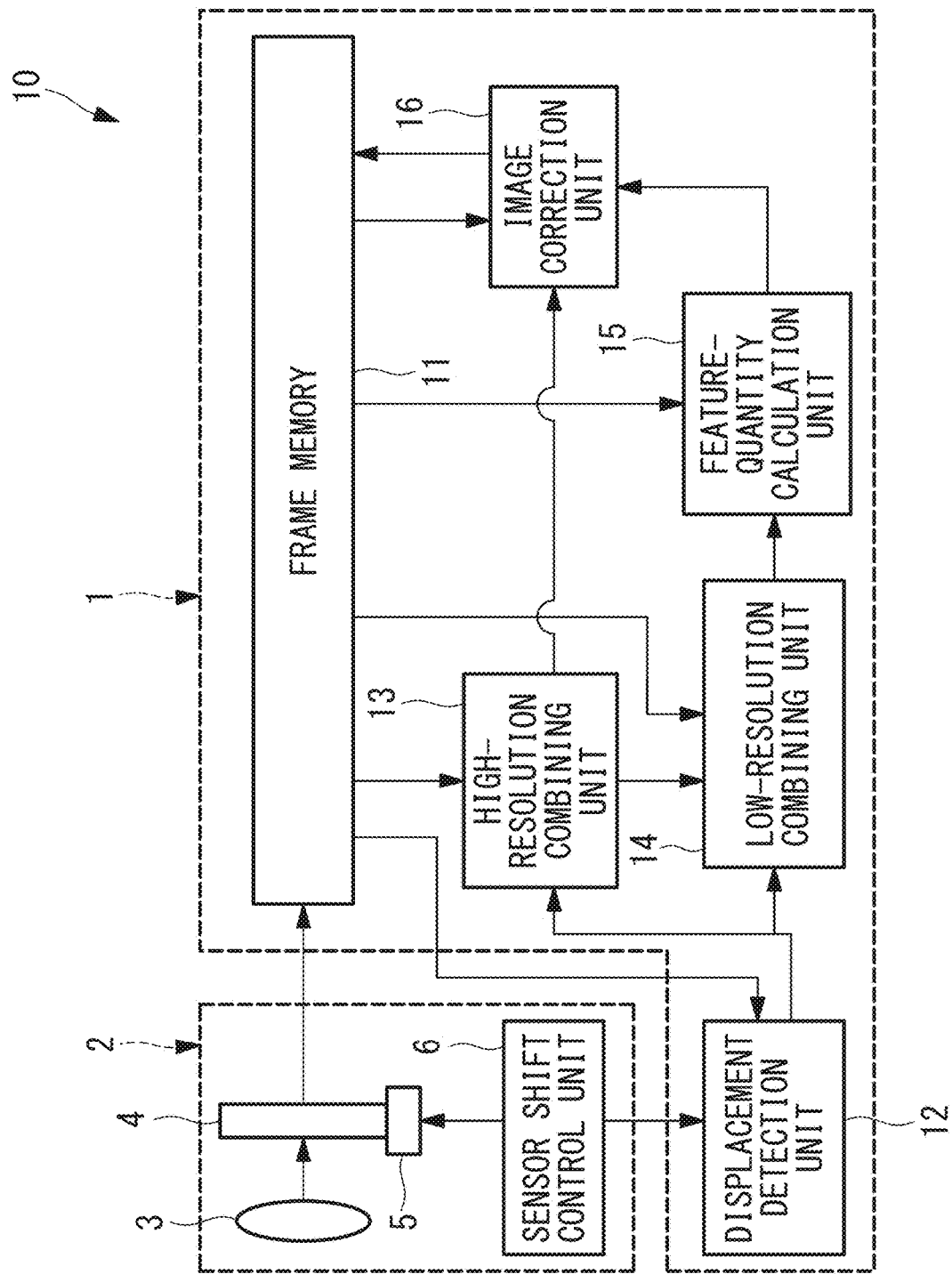
FIG. 1 is a block diagram showing the overall structure of an image processing device and an image capturing device according to a first embodiment of the present invention.

The image capturing device 10 according to this embodiment is, for example, a digital video camera, a digital still camera, or the like for acquiring and recording static images and dynamic images. FIG. 1 shows a block configuration of the image capturing device 10. As shown in FIG. 1, the image capturing device 10 includes: an image acquisition unit 2 that captures images of a subject and that acquires the images; and the image processing device 1 that processes the plurality of images acquired by the image acquisition unit 2 and that generates an image having a higher resolution than the plurality of images.

The image acquisition unit 2 includes, for example: an image capturing lens 3 for forming an optical image by focusing light from the subject; an image capturing element 4 for acquiring an image by capturing the optical image formed by the image capturing lens 3; a sensor shift mechanism 5 for shifting the position of the image capturing element 4 in the pixel arrangement directions; and a sensor shift control unit 6 for controlling the direction of shift and the amount of shift of the image capturing element 4 performed by the sensor shift mechanism 5.

The image capturing element 4 has many pixels two-dimensionally arranged along a horizontal direction and a vertical direction that are orthogonal to each other. The image capturing element 4 has a so-called Bayer array structure in which four types of color filters including R, Gr, Gb, and B are arranged in a two-row and two-column format, and one color filter corresponds to one pixel. The image capturing element 4 acquires a plurality of time-series images by performing image acquisition multiple times. The acquired images are output from the image capturing element 4 to a frame memory 11 in the image processing device 1 and are stored in the frame memory 11 in a time-series manner.

The sensor shift mechanism 5 includes an actuator (not shown in the figure) capable of shifting the image capturing element 4 in units of sub-pixels in the horizontal direction and the vertical direction of the image capturing element 4.

The sensor shift control unit 6 controls the direction of shift and the amount of shift of the image capturing element 4 by controlling the actuator of the sensor shift mechanism 5. The sensor shift control unit 6 shifts the image capturing element 4 by controlling the sensor shift mechanism 5 while the image capturing element 4 is performing image acquisition multiple times and outputs, to a displacement detection unit 12 in the image processing device 1, sensor shift control information including information about the directions of shift and the amounts of shift of the image capturing element 4.

Figure 2:
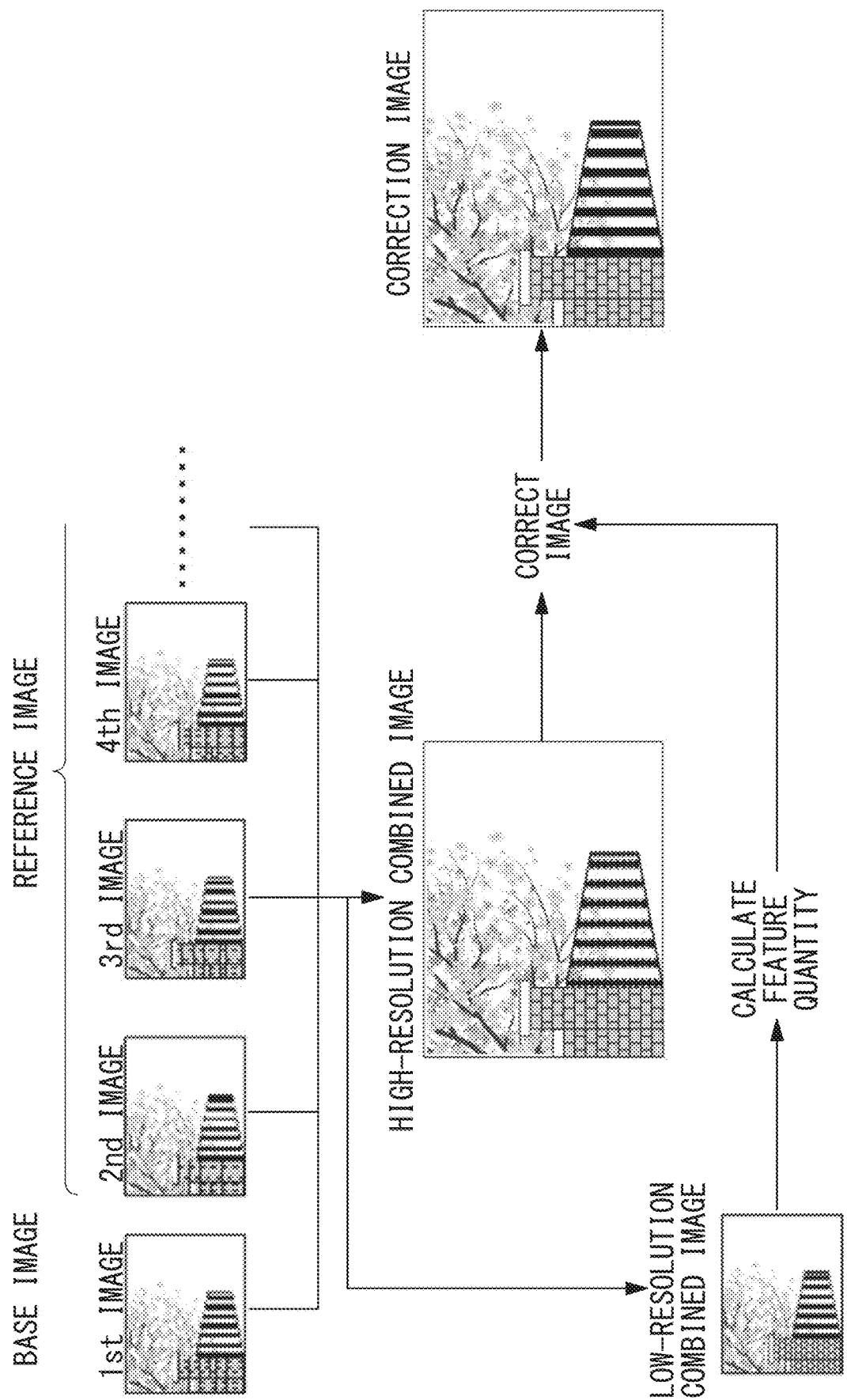
FIG. 2 is a schematic diagram for illustrating image processing with the image processing device in FIG. 1.

The image processing device 1 includes: the frame memory 11; the displacement detection unit 12; a high-resolution combining unit 13; a low-resolution combining unit 14; a feature-quantity calculation unit 15; and an image correction unit 16. FIG. 2 shows processes for image processing in the image processing device 1.

The frame memory 11 stores, in a time-series manner, a plurality of images input from the image acquisition unit 2. At this time, the frame memory 11 stores, as a base image, the one image that has been input first and stores, as a reference image, at least one image that has been input thereafter. The frame memory 11 can be accessed by the image acquisition unit 2 and any of the units 12, 13, 14, 15, and 16 in the image processing device 1.

The displacement detection unit 12 detects the amount of displacement between the base image and the reference image on the basis of the sensor shift control information from the sensor shift control unit 6 and outputs the detected amount of displacement to the high-resolution combining unit 13 and the low-resolution combining unit 14.

The high-resolution combining unit 13 reads the base image and the reference image from the frame memory 11. Next, while aligning the base image and the reference image on the basis of the amount of displacement from the displacement detection unit 12, the high-resolution combining unit 13 arranges the base image and the reference image in a high-resolution image space for each of the color channels (R, Gr, Gb, and B).

Figure 3:
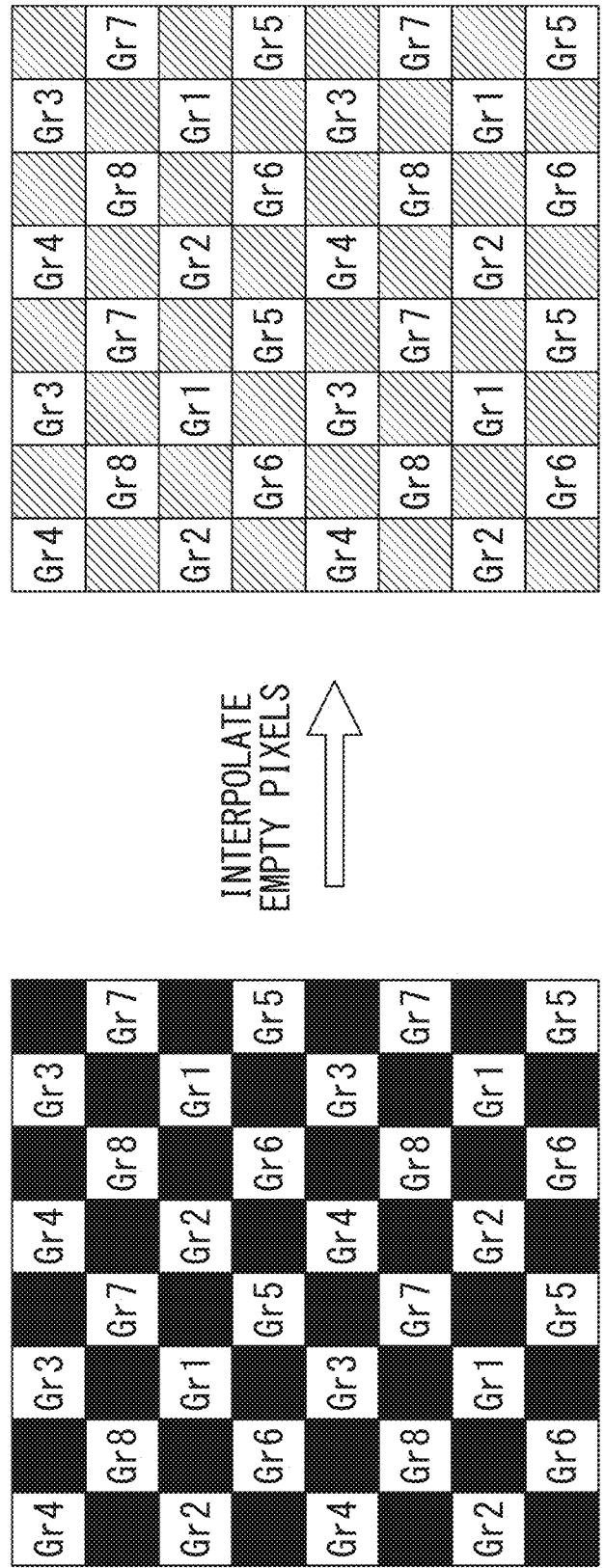
FIG. 3 is a diagram for illustrating a method for generating a high-resolution combined image with a high-resolution combining unit.

FIG. 3 shows the process of generating a high-resolution combined image for the Gr channel from one base image and seven reference images. As shown in the left side of FIG. 3, the high-resolution combining unit 13 arranges each pixel of the base image in the high-resolution image space having a higher resolution than the base image and the reference images and then arranges each pixel of each of the reference images in the high-resolution image space on the basis of the amount of displacement of the reference image relative to the base image. In the example in FIG. 3, the high-resolution image space has a resolution four-times as high as that of the base image and the reference images, and thus, the high-resolution combining unit 13 aligns each pixel on the basis of twice the amount of displacement (amount of shift). In the case where a pixel of the same color as that of the pixel to be arranged is already arranged when pixels are to be arranged, the pixel need not be arranged newly, or the pixel value may be updated by arithmetically averaging the pixel to be arranged and the pixel that is already arranged.

Figure 4:
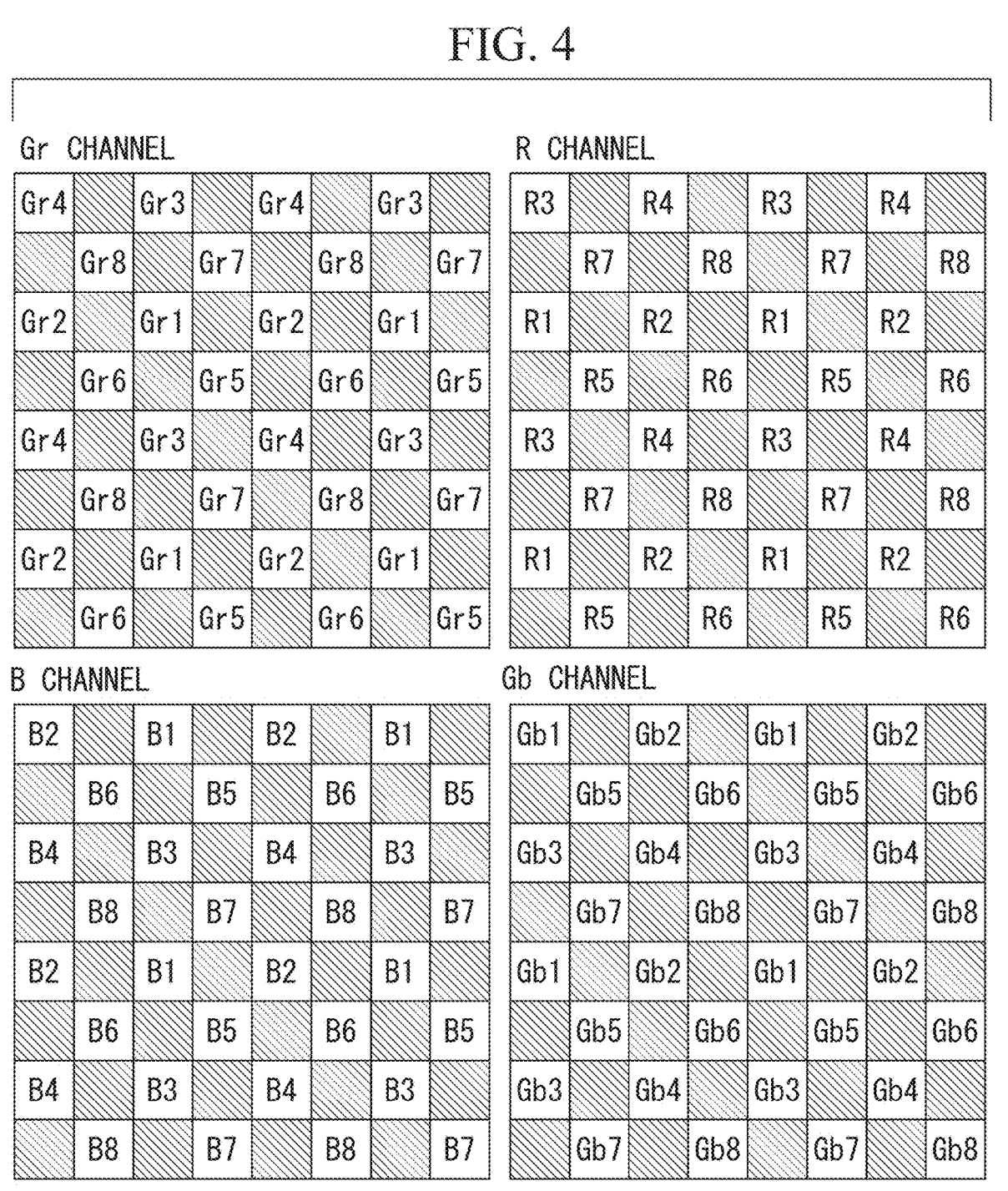

After all pixels of the base image and the reference images have been arranged, the high-resolution combining unit 13 performs the process of filling, by interpolation, empty regions in which no pixels of the base image or the reference images are arranged, as shown in the right side of FIG. 3. In FIG. 3, black regions represent empty regions, hatched pixels represent pixels generated by interpolation, and the other pixels represent pixels arranged as being derived from the base image or reference images. By doing so, the high-resolution combined image is generated. The interpolation method may be, for example, direction determination interpolation in consideration of an edge direction by using surrounding pixels that have been arranged, or may be an interpolation method for copying the closest pixel. As shown in FIG. 4, the high-resolution combining unit 13 also generates high-resolution combined images for the R, Gb, and B channels in the same manner.

In FIGS. 3 and 4, the numbers serving as suffixes of R, Gr, Gb, and B indicate the order of image acquisition. More specifically, suffix number "1" indicates that the pixel is a pixel of the base image acquired as the first image, and suffix numbers "2" to "8" indicate that the pixels are pixels of the reference images acquired as the second to eighth images. FIGS. 3 and 4 show pixel arrangements in the case where the position of the image capturing element 4 is controlled as follows by the sensor shift control unit 6 when images are acquired with the image capturing element 4.

1: Base image,
2: 1 pixel in the horizontal direction and 0 pixels in the vertical direction relative to the base image,
3: 0 pixels in the horizontal direction and 1 pixel in the vertical direction relative to the base image,
4: 1 pixel in the horizontal direction and 1 pixel in the vertical direction relative to the base image,
5: 0.5 pixels in the horizontal direction and 0.5 pixels in the vertical direction relative to the base image,
6: 1.5 pixels in the horizontal direction and 0.5 pixels in the vertical direction relative to the base image,
7: 0.5 pixels in the horizontal direction and 1.5 pixels in the vertical direction relative to the base image, and
8: 1.5 pixels in the horizontal direction and 1.5 pixels in the vertical direction relative to the base image.

The low-resolution combining unit 14 reads the base image and the reference images from the frame memory 11. Next, while aligning the base image and each of the reference images on the basis of the amount of displacement from the displacement detection unit 12, the low-resolution combining unit 14 arranges the base image and the reference images in a low-resolution image space for each of the color channels, thereby generating low-resolution combined images for the Gr channel and the Gb channel, which include a large amount of luminance information and are appropriate for the calculation of feature quantities.

FIG. 5 illustrates the process of generating low-resolution combined images for the Gr channel and the Gb channel from one base image and seven reference images. As shown in the left side of FIG. 5, the low-resolution combining unit 14 arranges each pixel of the base image in the low-resolution image spaces each having a resolution equal to or lower than the resolution of the base image and the reference images and then arranges each pixel of each of the reference images in the low-resolution image spaces on the basis of the amount of displacement of the reference image relative to the base image. FIG. 5 shows, as one example, a case where each of the low-resolution image spaces has a resolution equal to the resolution of the base image and the reference images. Therefore, the low-resolution combining unit 14 aligns each pixel on the basis of one-times the amount of displacement (amount of shift).

Because each of the low-resolution image spaces has a resolution equal to or lower than the resolution of the base image and the reference images, a plurality of pixels derived from different images are aligned at the same position in the low-resolution image space. In the case where a pixel of the same color as that of the pixel to be arranged is already arranged, the low-resolution combining unit 14 updates the pixel value by weighted addition of the pixel value of the pixel to be arranged and the pixel value of the pixel that is already arranged. By doing so, the low-resolution combined images are generated by weighted addition of the base image and the reference images. FIG. 5 shows, as an example of weighted addition, arithmetic averaging in which two pixel values are added with each pixel value weighted by 0.5. However, the two pixel values may be weighted by coefficients different from each other.

In the example in FIG. 5, the pixels of the first image and fifth image, the pixels of the second image and sixth image, the pixels of the third image and seventh image, and the pixels of the fourth image and eighth image are aligned at the same respective positions in each of the low-resolution image spaces. Therefore, the value of each pixel of each of the low-resolution combined images is represented by the arithmetically averaged value of the pixels of the first image and fifth image, the arithmetically averaged value of the pixels of the second image and sixth image, the arithmetically averaged value of the pixels of the third image and seventh image, or the arithmetically averaged value of the pixels of the fourth image and eighth image. For example, the value of the upper left pixel of the low-resolution combined image for the Gr channel is the arithmetically averaged value of the pixels of the fourth image and the eighth image.

Next, the low-resolution combining unit 14 generates a low-resolution combined image for the G channel by arithmetically averaging the low-resolution combined image for the Gr channel and the low-resolution combined image for the Gb channel. The low-resolution combined image for the G channel is output from the low-resolution combining unit 14 to the feature-quantity calculation unit 15.

In the example in FIG. 5, when the pixel position, of a pixel of each image, in each of the low-resolution image spaces is to be calculated from the amount of displacement, an amount of displacement of 0.5 pixels or less is rounded down, and values larger than 0.5 pixels are rounded up. However, the decimal places of the amount of displacement may be rounded off.

In addition, in the example in FIG. 5, all regions of each of the low-resolution combined images are filled with pixels of some images. However, depending on the direction of shift and the amount of shift of the image capturing element 4, the low-resolution combined image may also have empty regions in which no image pixels are arranged. In such a case, the empty regions of the low-resolution combined image are filled with pixels by interpolation in the same manner as the interpolation performed for the empty regions in the high-resolution combined images.

The feature-quantity calculation unit 15 sets, as a pixel of interest, one pixel in the low-resolution combined image for the G channel generated by the low-resolution combining unit 14 and calculates an edge direction in the pixel of interest as a feature quantity of said pixel of interest. The feature-quantity calculation unit 15 sets all pixels in the low-resolution combined image as a pixel of interest in order and repeats the calculation of a feature quantity. Therefore, the same number of feature quantities as the number of pixels of the low-resolution combined image are calculated.

The calculation of a feature quantity may be performed in units of regions each including multiple pixels, instead of pixel-by-pixel calculation. In other words, the feature-quantity calculation unit 15 may divide the low-resolution combined image into a plurality of regions and calculate the feature quantity in each of the regions.

Figures 6A, 6B:
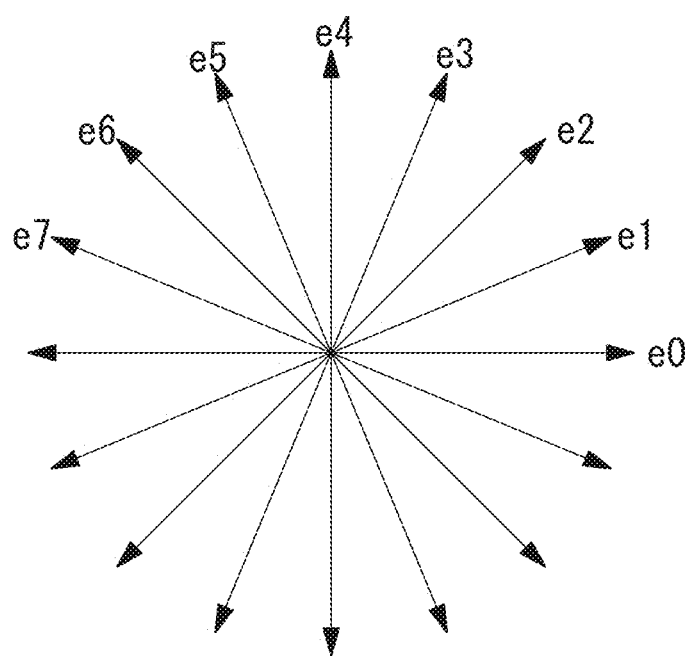
FIG. 6A is a diagram for illustrating a method for calculating a feature quantity with a feature-quantity calculation unit, showing a portion of the low-resolution combined image.
FIG. 6B is a diagram for illustrating eight directions in which calculation is performed by the feature-quantity calculation unit.

FIGS. 6A and 6B show one example of a method for calculating an edge direction. In this example, the amounts of change in pixel value along eight directions e0 to e7 are calculated by using 5×5 pixels with a pixel of interest at the center. More specifically, the absolute value of the difference between the pixel value of the pixel of interest and the pixel value of each of the four pixels other than the pixel of interest is calculated for each of the directions e0 to e7 on the basis of the following expression, and the sum of the absolute values of the differences is calculated. Then, it is determined that the direction indicating the minimum sum of the sums for the eight directions e0 to e7 is an edge direction.

$$e0=|G22-G23|+|G22-G24|+|G22-G21|+|G22-G20|$$

$$e1=|G22-G23|+|G22-G14|+|G22-G21|+|G22-G30|$$

$$e2=|G22-G13|+|G22-G04|+|G22-G31|+|G22-G40|$$

$$e3=|G22-G12|+|G22-G03|+|G22-G32|+|G22-G41|$$

$$e4=|G22-G12|+|G22-G02|+|G22-G32|+|G22-G42|$$

$$e5=|G22-G12|+|G22-G01|+|G22-G32|+|G22-G43|$$

$$e6=|G22-G11|+|G22-G00|+|G22-G33|+|G22-G44|$$

$$e7=|G22-G21|+|G22-G10|+|G22-G23|+|G22-G34|$$

If, for example, all sums in the directions e0 to e7 are equal to or less than a threshold value, it may be determined that the feature quantity is "no direction" by taking into account the values and the distribution thereof in the directions e0 to e7.

The above-described example is just one example, and another arbitrary method may be used to calculate an edge direction.

The spatial resolution of the distribution of feature quantities (the number of feature quantities) in each of the low-resolution image spaces is lower than the resolution of each of the high-resolution image spaces (the number of pixels in the high-resolution image space). The feature-quantity calculation unit 15 performs the process of extending the resolution of the distribution of feature quantities to the resolution of the high-resolution image space. As the method for extending the resolution of the distribution of feature quantities, a method for increasing the number of feature quantities by the nearest-neighbor method, the bilinear method, the bicubic method, or the like is used, as in image enlargement processing. By doing so, the number of feature quantities is increased to the same number as the number of pixels of the high-resolution combined image, and a feature quantity for each pixel of the high-resolution combined image is obtained. The calculated feature quantities are output from the feature-quantity calculation unit 15 to the image correction unit 16.

Alternatively, the low-resolution combined image may be enlarged so as to have a resolution equal to the resolution of the high-resolution combined image, and then the feature quantity for each pixel in the resolution-increased low-resolution combined image may be calculated.

The high-resolution combined images are input from the high-resolution combining unit 13 to the image correction unit 16, and the distribution of feature quantities having a resolution equal to the resolution of each of the high-resolution combined images is input from the feature-quantity calculation unit 15 to the image correction unit 16. The image correction unit 16 generates correction images by applying direction filtering to the high-resolution combined images in the edge directions, serving as feature quantities. The generated correction images are stored in the frame memory 11.

Figure 7:
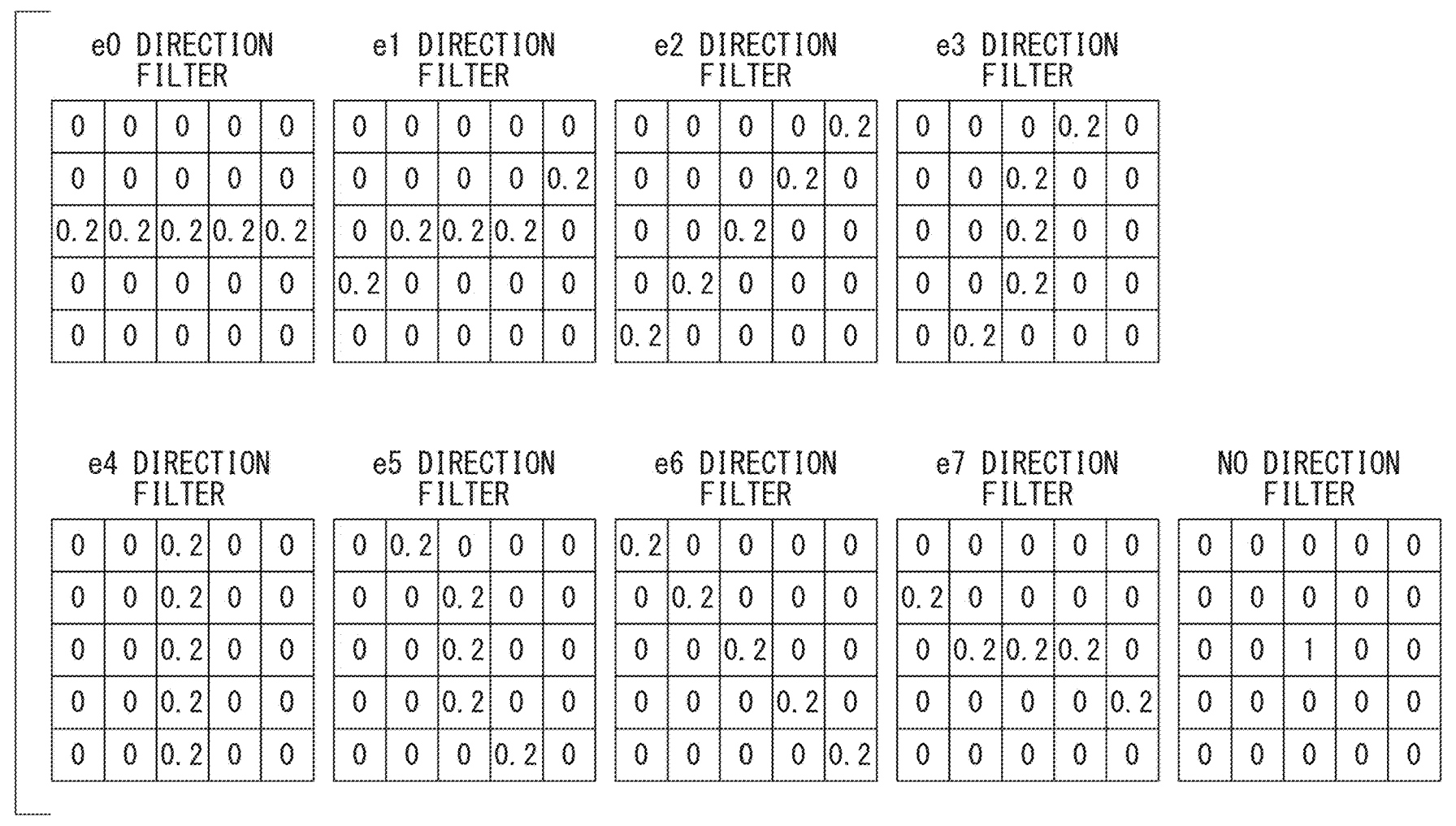

Direction filtering is the process of multiplying a plurality of pixels arranged in a predetermined direction by a filter coefficient. FIG. 7 shows examples of direction filtering and a coefficient corresponding to each edge direction. In these examples, e0-e7 direction filtering corresponding to the directions e0 to e7, serving as feature quantities, are set. The image correction unit 16 selects one of the e0-e7 direction filters on the basis of the feature quantity and applies the selected direction filter to the high-resolution combined images. Although FIG. 7 shows, as one example, direction filters for multiplying five pixels by a filter coefficient of 0.2, arbitrary direction-dependent filters can be used. If the feature quantity is "no direction", only the pixel of interest may be multiplied by a coefficient of 1 (substantially no filtering), as shown by the "no direction filter" in FIG. 7, or an arbitrary direction-independent filter, such as a Gaussian filter, may be applied.

Next, the operation of the image processing device 1 according to this embodiment with the above-described structure and the image capturing device 10 will be described.

The image capturing device 10 acquires eight images by causing the image capturing element 4 to acquire, eight times in a row, subject images formed by the image capturing lens 3. At this time, as a result of the image capturing element 4 performing image acquisition while the sensor shift mechanism 5 is shifting the image capturing element 4 on the basis of a command signal from the sensor shift control unit 6, eight time-series images having subject positions displaced relative to one another are acquired. The eight acquired images are stored in the frame memory 11.

Thereafter, an image processing method according to one embodiment of the present invention is performed by using the eight images stored in the frame memory 11.

First of all, the displacement detection unit 12 detects the amount of displacement between the base image and each of the reference images, and the amount of displacement is input to the high-resolution combining unit 13 and the low-resolution combining unit 14. In addition, the base image and the reference images are read from the frame memory 11 into the high-resolution combining unit 13 and the low-resolution combining unit 14.

In the high-resolution combining unit 13, the pixels of the eight images are arranged in the high-resolution image space for each color channel while being aligned on the basis of the amounts of displacement, thereby generating a high-resolution combined image for each color channel (high-resolution combination step).

In line with the generation of the high-resolution combined images, in the low-resolution combining unit 14, a low-resolution combined image for the Gr channel is generated as a result of the Gr channels of the eight images being added to each other by weighted addition, and a low-resolution combined image for the Gb channel is generated as a result of the Gb channels of the eight images being added to each other by weighted addition (low-resolution combination step). Next, a low-resolution combined image for the G channel is generated by arithmetically averaging the low-resolution combined image for the Gr channel and the low-resolution combined image for the Gb channel with each other.

Next, in the feature-quantity calculation unit 15, an edge direction at each pixel is calculated as the feature quantity of the pixel of the low-resolution combined image for the G channel (feature-quantity calculation step).

Next, in the image correction unit 16, direction filtering is applied to the high-resolution combined images along the edge direction at each pixel, thereby correcting the high-resolution combined images (image correction step).

In this case, individual images acquired by the image acquisition unit 2 can suffer folding noise (aliasing) in a subject region such as a fine pattern. According to this embodiment, the subject positions in the eight images that are acquired while the position of the image capturing element 4 is being shifted are displaced by 0.5 to 1.5 pixels relative to one another. By arranging the pixels of the eight images in the high-resolution image spaces while the pixels are being aligned according to the amounts of displacement of the subject, not only can folding noise be removed but also high-resolution combined images with increased resolution can be obtained.

On the other hand, the high-resolution combined images can suffer a knurl artifact, particularly at an edge portion having a large luminance difference, due to an alignment error on the order of several pixels. A pixel alignment error can be caused by an error in controlling the position of the image capturing element 4 by means of the sensor shift control unit 6, an error in positioning the image capturing element 4 by means of the sensor shift mechanism 5, etc.

Also in the low-resolution combined image, not only folding noise but also random noise is reduced by weighted addition and combining of the eight images in which the subject positions differ from one another. If a single image is used to calculate a feature quantity, it is very difficult to correctly calculate an edge direction in a subject region suffering folding noise. On the other hand, by using the low-resolution combined image with reduced folding noise and random noise, it is possible to correctly calculate an edge direction even in a subject region as described above.

As described above, by applying direction filtering to the high-resolution combined images on the basis of a correct edge direction, not only is a knurl artifact appropriately corrected but also direction filtering is applied in an appropriate direction without being affected by folding noise even in a subject region suffering folding noise. This affords an advantage in that both suppression of knurl artifacts and enhancement in the resolution of a region suffering folding noise can be achieved.

Second Embodiment

Next, an image processing device 1 according to a second embodiment of the present invention and an image capturing device 10 will be described with reference to FIG. 8.

The image capturing device 10 according to this embodiment has the same device configuration as the image capturing device 10 according to the first embodiment and includes an image acquisition unit 2 and an image processing device 1. Note, however, that the second embodiment differs from the first embodiment in the processing performed by the feature-quantity calculation unit 15 and the image correction unit 16 of the image processing device 1. Therefore, for this embodiment, the processing in the feature-quantity calculation unit 15 and the image correction unit 16 will be described, and a description of the structures common to those in the first embodiment will be omitted.

The feature-quantity calculation unit 15 sets, as a pixel of interest, one pixel in a low-resolution combined image generated by the low-resolution combining unit 14 and calculates, as feature quantities, the correlations between the pixel of interest and each of the pixels surrounding the pixel of interest. Next, the feature-quantity calculation unit 15 sets, as a pixel of interest, all pixels in the low-resolution combined image in order and repeats the calculation of feature quantities. The feature-quantity calculation unit 15 increases the number of feature quantities to the same number as the number of pixels of each of the high-resolution combined images by extending the spatial resolution of the distribution of feature quantities to the resolution of the high-resolution space.

FIG. 8 shows one example of a method for calculating correlations. In this example, a total of 25 values are calculated by using 5×5 pixels around the pixel of interest at the center. More specifically, the absolute value of the difference between the pixel value of the pixel of interest and the pixel value of each of the 25 pixels is calculated as a correlation on the basis of the following expression.

Correlation between the pixel of interest G22 and the pixel G00=|G22−G00|

Correlation between the pixel of interest G22 and the pixel G01=|G22−G01|

Correlation between the pixel of interest G22 and the pixel G02=|G22−G02|. . .

Correlation between the pixel of interest G22 and the pixel G43=|G22−G43|

Correlation between the pixel of interest G22 and the pixel G44=|G22−G44|

In other words, pixels having high correlations with the pixel of interest have small absolute values, and pixels having low correlations with the pixel of interest have large absolute values. Therefore, the correlation between the pixel of interest and itself is calculated as zero.

In the example in FIG. 8, 25 values are calculated as feature quantities for one pixel of interest, and hence, when the number of feature quantities is to be increased, the number of feature quantities needs to be increased in units of sets each composed of 25 values. Therefore, the same number of feature quantities as the number of pixels of each of the high-resolution combined images is output from the feature-quantity calculation unit 15 to the image correction unit 16 such that every 25 feature quantities constitute one set.

Alternatively, the low-resolution combined image may be enlarged so as to have a resolution equal to the resolution of the high-resolution combined image, and then the feature quantity for each pixel in the resolution-increased low-resolution combined image may be calculated. In this case, as the feature quantities for each pixel of interest, the 25 values can be output as-is to the image correction unit 16.

Although a region composed of 5×5 pixels is used to calculate correlations in the example in FIG. 8, the size of the region can be changed arbitrarily. In addition, the correlation between a region of interest composed of a plurality of pixels and each of the peripheral regions surrounding the region of interest may be calculated.

The image correction unit 16 generates correction images by applying bilateral filtering to the high-resolution combined images. The weighting coefficients of bilateral filtering are preset on the basis of the distance between the pixel of interest and each of the peripheral pixels. The image correction unit 16 corrects the weighting coefficients on the basis of 25 values, serving as feature quantities, so that the higher the correlation with the pixel of interest, the larger the weighting coefficient and so that the lower the correlation with the pixel of interest, the smaller the weighting coefficient and then applies bilateral filtering to the high-resolution combined images by using the corrected weighting coefficients.

This can provide an effect substantially the same as that of the image correction by means of the direction-dependent filter in the first embodiment without being affected by knurl artifacts included in the high-resolution combined images.

In the first and second embodiments, the displacement detection unit 12 calculates the amount of displacement between images on the basis of the sensor shift control information from the sensor shift control unit 6 of the image acquisition unit 2. Instead of this, the displacement detection unit 12 may read the base image and the reference images from the frame memory 11 and calculate the amount of motion between the base image and each of the reference images, as the amount of displacement. The amount of motion may be the amount of global motion of the entire image or the amount of local motion of each region. For example, an image may be divided into a plurality of blocks each composed of 32×32 pixels, and motion vectors in the horizontal direction and the vertical direction may be calculated for each of the blocks by using the block matching method or the like. The amount of motion may be not only the amounts of motion in the horizontal direction and vertical direction but also the amount of motion in the direction of rotation or a change in the enlargement/reduction factor.

In successive acquisition of subject images, a plurality of images having the subject positions displaced relative to one another may be acquired as a result of the image capturing element 4 being shifted relative to the subject due to, for example, camera shake or the like. In this manner, even in the case where the direction of shift and the amount of shift of the image capturing element 4 are unknown, the process of increasing the resolution by means of the image processing device 1 can be applied by detecting the amounts of displacement through image processing on the basis of images.

The image processing methods according to the first and second embodiments can be executed not only by the image processing device 1 composed of circuits but also by image processing programs. In this case, the image processing device 1 includes: a processor such as a CPU; a main storage device such as a RAM; and a computer-readable, non-temporary storage medium for storing an image processing program for realizing all or some of the above-described processes. The storage medium is, for example, a magnetic disk, a magneto-optical disk, a CD-ROM, a DVD-ROM, or a semiconductor memory. The same processing as with the above-described image processing device 1 can be realized by reading the image processing programs from the storage medium to the main storage device and by causing the processor to process information and execute arithmetic operations according to the image processing programs.

As a result, the above-described embodiments lead to the following aspects.

An aspect of the present invention is an image processing device for combining a plurality of time-series images in which subject positions are displaced from each other and generating an image having a higher resolution than the plurality of images, the image processing device including: a high-resolution combining unit that aligns the plurality of images with each other in a high-resolution image space having a higher resolution than the plurality of images on the basis of the amount of displacement between the plurality of images, that combines the plurality of images, and that generates a high-resolution combined image; a low-resolution combining unit that aligns the plurality of images with each other in a low-resolution image space having a resolution equal to or lower than the resolution of the plurality of images on the basis of the amount of displacement, that combines the plurality of images through weighted addition, and that generates a low-resolution combined image; a feature-quantity calculation unit for calculating a feature quantity pertaining to a pixel-value change direction at each region in the low-resolution combined image generated by the low-resolution combining unit; and an image correction unit for correcting the high-resolution combined image on the basis of the feature quantity calculated by the feature-quantity calculation unit.

According to this aspect, in the high-resolution combining unit, the plurality of images are aligned with each other in the high-resolution image space and then combined, thus generating a high-resolution combined image in which folding noise in individual images has been removed. In the high-resolution combined image, a knurl artifact caused by an error in aligning the plurality of images can occur.

On the other hand, in the low-resolution combining unit, the plurality of images are aligned with each other in the low-resolution image space and then combined through weighted addition, thus generating a low-resolution combined image in which folding noise included in individual images has been removed. In the feature-quantity calculation unit, as a result of such a low-resolution combined image being used, an accurate direction in which the pixel values change at each region is calculated as a feature quantity without being affected by folding noise. A region may be composed of one pixel or may be composed of a plurality of pixels.

Therefore, in the image correction unit, it is possible to apply appropriate image processing to each region in the high-resolution combined image on the basis of the feature quantity and reduce a knurl artifact while retaining the resolution-increasing effect in a region suffering folding noise. By doing so, it is possible to achieve both suppression of a knurl artifact and enhancement of the resolution in a region suffering folding noise.

The above-described first aspect may include: a displacement detection unit for detecting the amount of motion between the plurality of images as the amount of displacement between the plurality of images.

By doing so, the amount of displacement between the plurality of images can be easily calculated.

In the above-described first aspect, the high-resolution combining unit may arrange each pixel of the plurality of images in the high-resolution image space on the basis of the amount of displacement.

By doing so, the high-resolution combined image can easily be generated.

In the above-described first aspect, the high-resolution combining unit may interpolate a pixel that is not arranged on the basis of information about pixels arranged in the high-resolution image space.

By doing so, a region that does not have a pixel arranged therein and that is present between pixels of one high-resolution combined image formed by combining the plurality of images through pixel arrangement can be filled with pixel information, thereby further increasing the resolution.

In the above-described first aspect, the low-resolution combining unit may arrange each pixel of the plurality of images in the low-resolution image space on the basis of the amount of displacement.

By doing so, the low-resolution combined image can easily be generated.

In the above-described first aspect, the low-resolution combining unit may interpolate a pixel that is not arranged on the basis of information about pixels arranged in the low-resolution image space.

By doing so, a region that does not have a pixel arranged therein and that is present between pixels of one low-resolution combined image formed by combining the plurality of images through pixel arrangement can be filled with pixel information, thereby further increasing the resolution.

In the above-described first aspect, the feature-quantity calculation unit may calculate, as the feature quantity, an edge direction at each region in the low-resolution combined image. In this case, the image correction unit may apply, to the high-resolution combined image, filtering along the edge direction calculated by the feature-quantity calculation unit.

By doing so, a knurl artifact in the high-resolution combined image can be more effectively reduced.

In the above-described first aspect, the feature-quantity calculation unit may calculate, as the feature quantity, a correlation between each region and a peripheral region thereof in the low-resolution combined image. In this case, the image correction unit may apply bilateral filtering to the high-resolution combined image by using a weighting coefficient that is set on the basis of the distance between each region and a peripheral region and correct the weighting coefficient so that the higher the correlation, the larger the weighting coefficient and so that the lower the correlation, the smaller the weighting coefficient.

By doing so, a knurl artifact in the high-resolution combined image can be more effectively reduced.

In the above-described first aspect, the feature-quantity calculation unit may extend the resolution of the distribution of the feature quantities to the resolution of the high-resolution combined image.

By doing so, the spatial resolution of the feature quantities calculated by using the low-resolution combined image can be made to coincide with the resolution of the high-resolution combined image, thereby facilitating correction in the image correction unit.

Another aspect of the present invention is an image capturing device including: an image acquisition unit for acquiring a plurality of time-series images; and one of the above-described image processing devices for processing the plurality of images acquired by the image acquisition unit.

In the above-described second aspect, the image acquisition unit may include: an image capturing element; a sensor shift mechanism for shifting the position of the image capturing element in a pixel arrangement direction of the image capturing element; and a sensor shift control unit for controlling the direction of shift and the amount of shift of the image capturing element performed by the sensor shift mechanism.

By doing so, the plurality of images in which the subject positions are displaced from each other are acquired as a result of the sensor shift mechanism displacing the position of the image capturing element relative to the subject according to the direction of shift and the amount of shift controlled by the sensor shift control unit.

The above-described second aspect may include: a displacement detection unit for calculating the amount of displacement on the basis of the direction of shift and the amount of shift of the image capturing element controlled by the sensor shift control unit.

By doing so, the amount of displacement between the plurality of images can be calculated more easily.

Another aspect of the present invention is an image processing method for combining a plurality of time-series images in which subject positions are displaced from each other and generating an image having a higher resolution than the plurality of images, the method including: a high-resolution combining step of aligning the plurality of images with each other in a high-resolution image space having a higher resolution than the plurality of images on the basis of the amount of displacement between the plurality of images, combining the plurality of images, and generating a high-resolution combined image; a low-resolution combining step of aligning the plurality of images with each other in a low-resolution image space having a resolution equal to or lower than the resolution of the plurality of images on the basis of the amount of displacement, combining the plurality of images through weighted addition, and generating a low-resolution combined image; a feature-quantity calculation step of calculating a feature quantity pertaining to a pixel-value change direction at each pixel or each region in the low-resolution combined image generated in the low-resolution combining step; and an image correction step of correcting the high-resolution combined image on the basis of the feature quantity calculated in the feature-quantity calculation step.

Another aspect of the present invention is a non-temporary computer-readable storage medium for storing an image processing program for causing a computer to execute image processing for combining a plurality of time-series images in which subject positions are displaced from each other and generating an image having a higher resolution than the plurality of images, the image processing program including: a high-resolution combining step of aligning the plurality of images with each other in a high-resolution image space having a higher resolution than the plurality of images on the basis of the amount of displacement between the plurality of images, combining the plurality of images, and generating a high-resolution combined image; a low-resolution combining step of aligning the plurality of images with each other in a low-resolution image space having a resolution equal to or lower than the resolution of the plurality of images on the basis of the amount of displacement, combining the plurality of images through weighted addition, and generating a low-resolution combined image; a feature-quantity calculation step of calculating a feature quantity pertaining to a pixel-value change direction at each pixel or each region in the low-resolution combined image generated in the low-resolution combining step; and an image correction step of correcting the high-resolution combined image on the basis of the feature quantity calculated in the feature-quantity calculation step.

The present invention affords an advantage in that when a higher-resolution image is to be combined from a plurality of images, it is possible to achieve both suppression of knurl artifacts and enhancement of the resolution of a region suffering folding noise.

REFERENCE SIGNS LIST

1 Image processing device
2 Image acquisition unit
3 Image capturing lens
4 Image capturing element
5 Sensor shift mechanism
6 Sensor shift control unit
10 Image capturing device
11 Frame memory
12 Displacement detection unit
13 High-resolution combining unit
14 Low-resolution combining unit
15 Feature-quantity calculation unit
16 Image correction unit

The invention claimed is:

1. An image processing device comprising:
at least one processor comprising hardware, the at least one processor being configured to:
generate a high-resolution combined image by aligning a plurality of time-series images with each other in a high-resolution image space having a resolution higher than a resolution of the plurality of time-series images based on an amount of displacement between the plurality of time-series images, and combining the plurality of time-series images;
generate a low-resolution combined image by aligning the plurality of time-series images with each other in a low-resolution image space having a resolution equal to or lower than the resolution of the plurality of time-series images based on the amount of displacement, and combining the plurality of time-series images through weighted addition;
calculate a feature quantity pertaining to a pixel-value change direction at each of plural regions in the generated low-resolution combined image; and
correct the high-resolution combined image based on the calculated feature quantity.

2. The image processing device according to claim 1, wherein the at least one processor is configured to detect an amount of motion between the plurality of time-series images as the amount of displacement between the plurality of time-series images.

3. The image processing device according to claim 1, wherein the generating of the high-resolution combined image comprises arranging each pixel of the plurality of time-series images in the high-resolution image space based on the amount of displacement.

4. The image processing device according to claim 3, wherein the generating of the high-resolution combined image comprises interpolating a pixel that is not arranged in the high-resolution space based on information about pixels arranged in the high-resolution image space.

5. The image processing device according to claim 1, wherein the generating of the low-resolution combined image comprises arranging each pixel of the plurality of time-series images in the low-resolution image space based on the amount of displacement.

6. The image processing device according to claim 5, wherein the generating of the low-resolution combined image comprises interpolating a pixel that is not arranged in the low-resolution space based on information about pixels arranged in the low-resolution image space.

7. The image processing device according to claim 1, wherein the calculating of the feature quantity comprises calculating, as the feature quantity, an edge direction at each of the plural regions in the low-resolution combined image.

8. The image processing device according to claim 7, wherein the calculating of the feature quantity comprises extending a resolution of a distribution of the feature quantities to a resolution of the high-resolution combined image.

9. The image processing device according to claim 7, wherein the correcting of the high-resolution combined image comprises applying, to the high-resolution combined image, filtering along the calculated edge direction.

10. The image processing device according to claim 1, wherein the calculating of the feature quantity comprises calculating, as the feature quantity, a correlation between each of the plural regions and a peripheral region thereof in the low-resolution combined image.

11. The image processing device according to claim 10, wherein the calculating of the feature quantity comprises extending a resolution of a distribution of the feature quantities to a resolution of the high-resolution combined image.

12. The image processing device according to claim 10, wherein the correcting of the high-resolution combined image comprises applying bilateral filtering to the high-resolution combined image by using a weighting coefficient that is set based on a distance between each of the plural regions and the peripheral region thereof and correcting the weighting coefficient so that the higher the correlation, the larger the weighting coefficient and so that the lower the correlation, the smaller the weighting coefficient.

13. An image capturing device comprising:
an image acquisition unit that is configured to acquire a plurality of time-series images; and the image processing device according to claim 1 for processing the acquired plurality of time-series images.

14. The image capturing device according to claim 13, wherein the image acquisition unit includes:
- an image capturing element;
- a sensor shift mechanism that is configured to shift a position of the image capturing element in a pixel arrangement direction of the image capturing element; and
- a sensor shift controller that is configured to control a direction of shift and an amount of shift of the image capturing element performed by the sensor shift mechanism.

15. The image capturing device according to claim 14, wherein the at least one processor is configured to calculate the amount of displacement based on the direction of shift and the amount of shift of the image capturing element controlled by the sensor shift control unit.

16. An image processing method comprising:
- generating, by at least one processor comprising hardware, a high-resolution combined image by aligning a plurality of time-series images with each other in a high-resolution image space having a resolution higher than a resolution of the plurality of time-series images based on an amount of displacement between the plurality of time-series images, and combining the plurality of time-series images;
- generating, by the at least one processor, a low-resolution combined image by aligning the plurality of time-series images with each other in a low-resolution image space having a resolution equal to or lower than the resolution of the plurality of time-series images based on the amount of displacement, and combining the plurality of time-series images through weighted addition;
- calculating, by the at least one processor, a feature quantity pertaining to a pixel-value change direction at each of plural regions in the generated low-resolution combined image; and
- correcting, by the at least one processor, the high-resolution combined image based on the calculated feature quantity.

17. A non-transitory computer-readable storage medium storing an image processing program thereon, the program being executable to control a computer to execute processes comprising:
- generating a high-resolution combined image by aligning the plurality of time-series images with each other in a high-resolution image space having a resolution higher than a resolution of the plurality of time-series images based on an amount of displacement between the plurality of time-series images, and combining the plurality of time-series images;
- generating a low-resolution combined image by aligning the plurality of time-series images with each other in a low-resolution image space having a resolution equal to or lower than the resolution of the plurality of time-series images based on the amount of displacement, and combining the plurality of time-series images through weighted addition;
- calculating a feature quantity pertaining to a pixel-value change direction at each of plural regions in the generated low-resolution combined image; and
- correcting the high-resolution combined image based on the calculated feature quantity.

* * * * *